US012035434B1

(12) United States Patent
Jackum et al.

(10) Patent No.: US 12,035,434 B1
(45) Date of Patent: Jul. 9, 2024

(54) DRIVER CIRCUIT AND METHOD FOR OPERATING A LIGHT EMITTING UNIT

(71) Applicant: Renesas Design (UK) Limited, Bourne End (GB)

(72) Inventors: Thomas Jackum, Graz (AT); Saska Lindfors, Graz (AT)

(73) Assignee: Renesas Design (UK) Limited, Bourne End (GB)

( * ) Notice: Subject to any disclaimer, the term of this patent is extended or adjusted under 35 U.S.C. 154(b) by 0 days.

(21) Appl. No.: 18/066,726

(22) Filed: Dec. 15, 2022

(51) Int. Cl.
*H05B 45/355* (2020.01)
*H05B 45/14* (2020.01)

(52) U.S. Cl.
CPC ........... *H05B 45/355* (2020.01); *H05B 45/14* (2020.01)

(58) Field of Classification Search
CPC ...... H05B 45/10; H05B 45/355; H05B 45/14; H05B 45/32; H05B 45/50; H05B 45/37; H05B 45/347; H05B 45/345; H05B 45/325
See application file for complete search history.

(56) References Cited

U.S. PATENT DOCUMENTS

| | | | | |
|---|---|---|---|---|
| 2009/0102397 | A1 | 4/2009 | Chang et al. | |
| 2014/0300292 | A1* | 10/2014 | Howes | H02M 3/156 323/349 |
| 2019/0088195 | A1* | 3/2019 | Khazeni | G09G 3/32 |
| 2020/0103705 | A1* | 4/2020 | Chen | H05B 45/32 |
| 2020/0404752 | A1* | 12/2020 | Lou | H05B 45/345 |

FOREIGN PATENT DOCUMENTS

| | | | |
|---|---|---|---|
| CN | 107231724 | A | 10/2017 |
| JP | 2019102297 | A | 6/2019 |

OTHER PUBLICATIONS

DE Office Action dated May 7, 2024 issued in DE 10 2023 209 650.1.

* cited by examiner

*Primary Examiner* — Abdullah A Riyami
*Assistant Examiner* — Syed M Kaiser
(74) *Attorney, Agent, or Firm* — SCULLY, SCOTT, MURPHY & PRESSER, P.C.

(57) ABSTRACT

A driver circuit for providing a driver current for operating a light emitting unit at a brightness level corresponding to a value of a brightness code. The driver circuit includes a digital-to-analog converter, DAC, stage configured to generate an intermediate signal in dependence of the value of the brightness code. Furthermore, the driver circuit includes a gain stage configured to amplify the intermediate signal in dependence of the value of the brightness code to provide the driver current.

15 Claims, 4 Drawing Sheets

DRIVER CIRCUIT AND METHOD FOR OPERATING A LIGHT EMITTING UNIT

TECHNICAL FIELD

The present document relates to a driver circuit for a light emitting unit, wherein the light emitting unit typically comprises one or more light emitting diodes (LEDs).

BACKGROUND

A light emitting unit which typically comprises one or more LEDs may be controlled in dependence of a brightness code, wherein the brightness code indicates the brightness level of the light which is to be emitted by the light emitting unit. A driver circuit may be configured to convert the (digital) brightness code into a driver signal (in particular into a driver current) which is fed to the light emitting unit to cause the light emitting unit to emit light at a brightness level which corresponds to the brightness code.

There may be an exponential relationship between the brightness level (and the corresponding value of the brightness code) and the level of the driver signal that is needed to trigger the light emitting unit to emit light at a particular brightness level.

The present document is directed at the technical problem of providing a driver circuit for a light emitting unit, which is configured to implement a pre-determined (exponential) relationship between brightness codes and driver signals in an efficient and precise manner.

SUMMARY

According to an aspect, a driver circuit for providing a driver current for operating a light emitting unit at a brightness level corresponding to a value of a brightness code is described. The driver circuit comprises a digital-to-analog converter, DAC, stage configured to generate an intermediate signal in dependence of the value of the brightness code. Furthermore, the driver circuit comprises a gain stage configured to amplify the intermediate signal in dependence of the value of the brightness code to provide the driver current.

According to a further aspect a method for providing a driver current for operating a light emitting unit at a brightness level corresponding to a value of a brightness code is described. The method comprises generating an intermediate signal in dependence of the value of the brightness code using a digital-to-analog converter, DAC, stage. Furthermore, the method comprises amplifying the intermediate signal in dependence of the value of the brightness code, using a gain stage, to provide the driver current.

It should be noted that the methods and systems including its preferred embodiments as outlined in the present document may be used stand-alone or in combination with the other methods and systems disclosed in this document. In addition, the features outlined in the context of a system are also applicable to a corresponding method. Furthermore, all aspects of the methods and systems outlined in the present document may be arbitrarily combined. In particular, the features of the claims may be combined with one another in an arbitrary manner.

In the present document, the term "couple" or "coupled" refers to elements being in electrical communication with each other, whether directly connected e.g., via wires, or in some other manner

SHORT DESCRIPTION OF THE FIGURES

The invention is explained below in an exemplary manner with reference to the accompanying drawings, wherein FIGS. 1 and 2 show example driver circuits for a light emitting unit;

DETAILED DESCRIPTION

Figure 1:
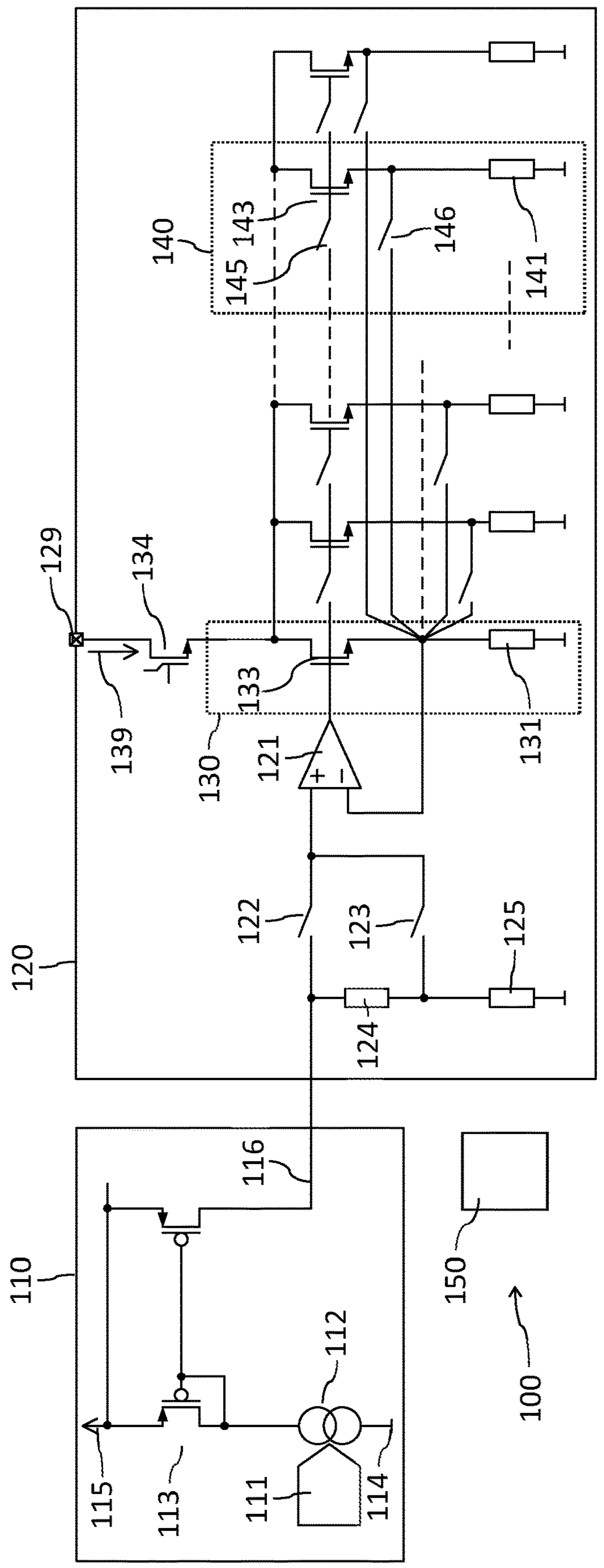

As indicated above, the present document is directed at providing a precise and efficient driver circuit for a light emitting unit. FIG. 1 shows a block diagram of an example driver circuit 100, wherein the driver circuit 100 comprises a DAC stage 110 and a gain stage 120. The DAC stage 110 comprises a DAC 111 (Digital-to-Analog Converter) which is configured to control a current source 112 in dependence of a brightness code. The current from the current source 112 may be mapped to the output of the DAC stage 110 using a current mirror 113. The DAC stage 110 may be operated between a supply voltage 115 and a reference potential 114, e.g., ground.

Overall, the DAC stage 110 is configured to provide an intermediate signal 116 (notably an intermediate current) at the output of the DAC stage 110, wherein the level of the intermediate signal 116 depends on the digital input value of the DAC 111. The DAC 111 may be configured to convert the digital input value into an analogue value and/or (using the current source 112) into a current at a certain level, notably into the intermediate signal 116. The mapping between the digital input value and the level of the intermediate signal 116 may be linear. Hence, a linear DAC 111 may be used.

Furthermore, a control unit 150 of the driver circuit 100 may make use of a pre-determined mapping table which maps a brightness code (that is indicative of the brightness level of the light emitting unit that is driven by the driver circuit 100) to a digital input value for the DAC 111. As will be outlined in the context of FIG. 3, the mapping between the brightness codes and the digital input values may be non-linear, in order to provide a precise approximation of a pre-determined target relationship between the driver signals 139 (notably the driver current) at the output 129 of the driver circuit 100 and the different brightness codes.

The gain stage 120 may be configured to amplify the intermediate signal 116, thereby providing the driver signal 139 of the driver circuit 100, which may be provided to the light emitting unit, thereby causing the light emitting unit to emit light at the brightness level which corresponds to a given brightness code.

The gain stage 120 may comprise an optional scaling unit for setting the input gain of the gain stage 120. The scaling unit may comprise resistors 124, 125 and switches 122, 123, as illustrated in FIG. 1. If switch 122 is closed (and switch 123 is open), the total input resistor at the first input of the differential amplifier 121 corresponds to the serial arrangement of resistors 124, 125. On the other hand, if switch 123 is closed (and switch 122 is open), total input resistor at the first input of the differential amplifier 121 corresponds to resistor 125.

The gain stage 120 comprises a main branch 130 and a set of auxiliary branches 140, wherein the different auxiliary branches 140 may be activated or deactivate individually, in order to set the overall gain of the gain stage 120. Each stage 130, 140 comprises a transistor 133, 143 and a resistive element 131, 141. The transistors 133, 143 are controlled by the output of the differential amplifier 121. The midpoint between the transistor 133, 143 and the resistive element 131, 141 of a branch 130, 140 may be fed back to the second input of the differential amplifier 121. The restive elements 131, 141 are coupled to the reference potential 114.

The driver current 139 at the output 129 of the gain stage 120 may be provided via a high voltage protection transistor 134. The level of the driver current 139 is set by the differential amplifier 121. The level of the driver current 139 may be changed by changing the number of activated auxiliary branches 140. An auxiliary branch 140 may be activated by closing the switches 145, 146 of the auxiliary branch 140. The activation of one or more auxiliary branches 140 causes the resistive elements 141 of the one or more auxiliary branches 140 to be arranged in parallel to the resistive element 131 of the main branch 130, thereby reducing the effective resistance of the output branch 130, 140. Furthermore, the transistors 143 of the one or more auxiliary branches 140 are arranged in parallel to the transistor 133 of the main branch 130.

The driver current $I_{out}$ 139 may be given by $$I_{out} = I_{in}\frac{R_{in}}{R_{out}}$$

wherein $I_{in}$ is the intermediate current 116 and wherein $R_{in}$ is the resistance of the resistor 125 (if the switch 123 is closed and the switch 122 is open) or of the serial arrangement of resistors 124, 125 (if the switch 123 is open and the switch 122 is closed). $R_{out}$ is the effective resistance of the output branch 130, 140 and it depends on which one or more of the auxiliary branches 140 are activated. By reducing $R_{out}$, the gain of the gain stage 120 may be increased. By selecting the resistance values of the different resistive elements 141 of the different auxiliary branches 140 appropriately, an exponential gain curve may be implemented.

In a preferred example, the following resistance values are used,

- resistor 124: 7*R (wherein R is an arbitrary resistance value);
- resistor 125: 3*R;
- resistor 131: 4/5*R;
- resistor 141 (auxiliary stage n=1): 2*R;
- resistor 141 (auxiliary stage n=2): 3/2*R; etc.
- resistor 141 (auxiliary stage n=N−1): R/96;
- resistor 141 (auxiliary stage n=N): R/128;

The transistors 133, 143 of the different branches 130, 140 are preferably operated within the same operating point. This may be achieved by adapting the size (notably the width) of the different transistors 133, 143 in accordance of the resistance value of the resistive element 131, 141 of the respective branch 130, 140.

Figure 3:
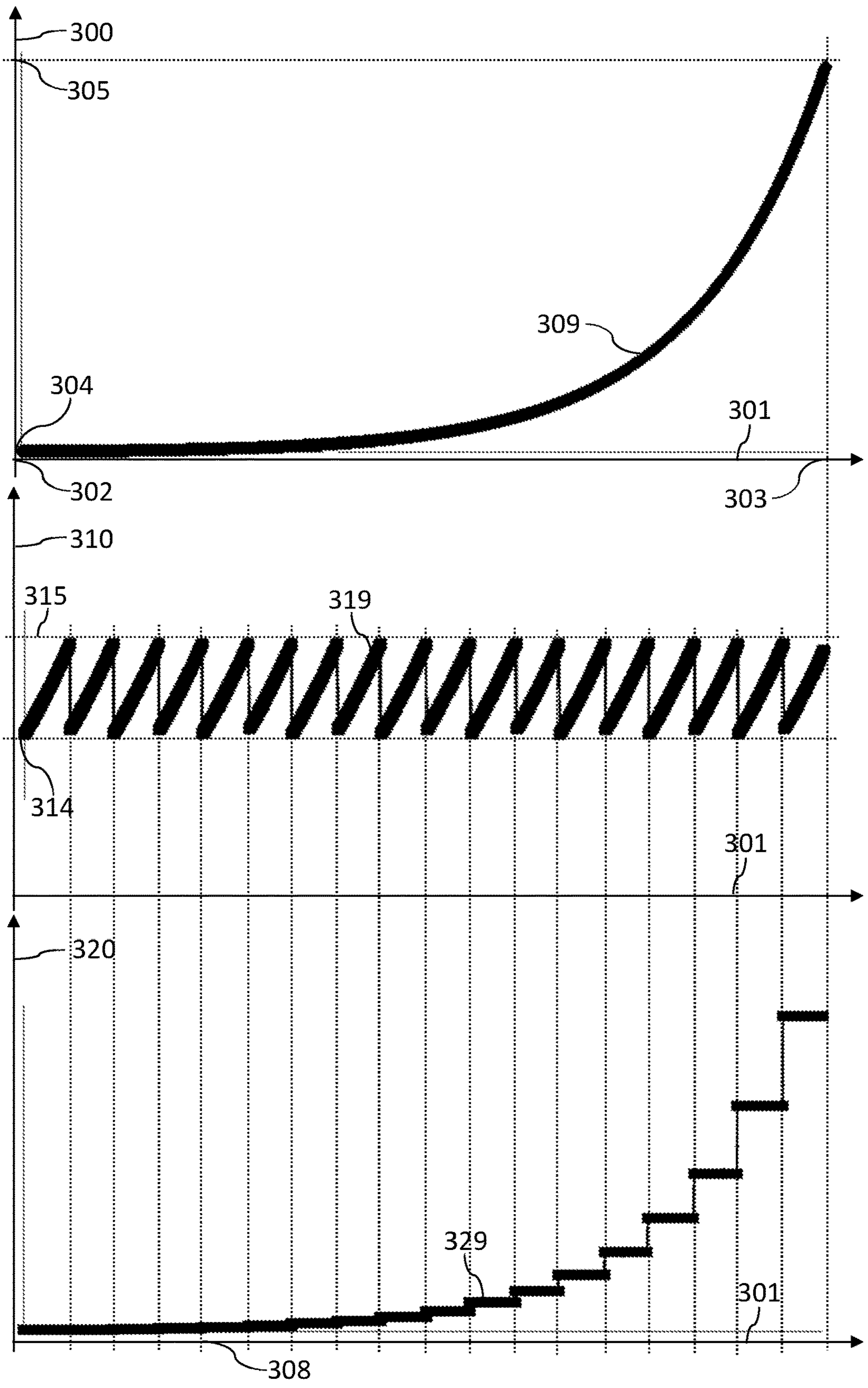
FIG. 3 shows example signals at the driver circuit.

FIG. 3 shows in the upper diagram a target relationship 309 between the brightness codes 301 and the level 300 of the driver current 139. The brightness code 301 may take on (integer) values between a minimum value 302 (e.g., 0) and a maximum value 303 (e.g., 2048). The level 300 of the driver current 139 may take on values between a minimum level 304 (e.g., 0 mA) and a maximum level 305 (e.g., 25 mA). The target relationship 309 may be an exponential function.

The gain stage 120 may be configured to provide a set 329 of different gain values 320. The gain values 320 increase in an exponential manner with increasing values of the brightness code 301. The complete range of possible values of the brightness code 301 may be subdivided into subranges 308, e.g., between 15 and 20 different subranges 308. For each subrange 308 a (exactly one) different gain value 320 may be provided. Hence, each subrange 308 may be associated with a particular configuration of the gain stage 120 (i.e., with a particular set of activated auxiliary branches 140).

The set 329 of gain values 320 (which is provided by the gain stage 120) may be used to approximate the target relationship 309 (in a relatively coarse manner, e.g., using only N different gain values 320, e.g., with N between 5 and 20). The DAC stage 110 may be used to provide an interpolation between two adjacent gain values 320 of the set 329 of gain values 320, such that the combination of the DAC stage 110 and the gain stage 120 provides a relatively precise approximation of the target relationship 309.

The interpolation may be achieved by making use of a mapping table 319 which maps the different values of the brightness code 301 to different digital input values 310 for the DAC 111. The digital input values 310 may take on values between a minimum value 314 and a maximum value 315. For each subrange 308 a mapping between the values of the brightness code 301 from the respective subrange 308 and corresponding digital input values 310 from the digital input value range may be provided. This mapping is typically non-linear, in order to provide a precise interpolation between the different (discrete) gain values 320. Furthermore, the mapping is typically different for different subranges 308. The mapping may be determined analytically and/or experimentally, such that the deviation of the approximated relationship (which is achieved by the driver circuit 100) and the target relationship 309 is reduced, in particular minimized.

Figure 2:
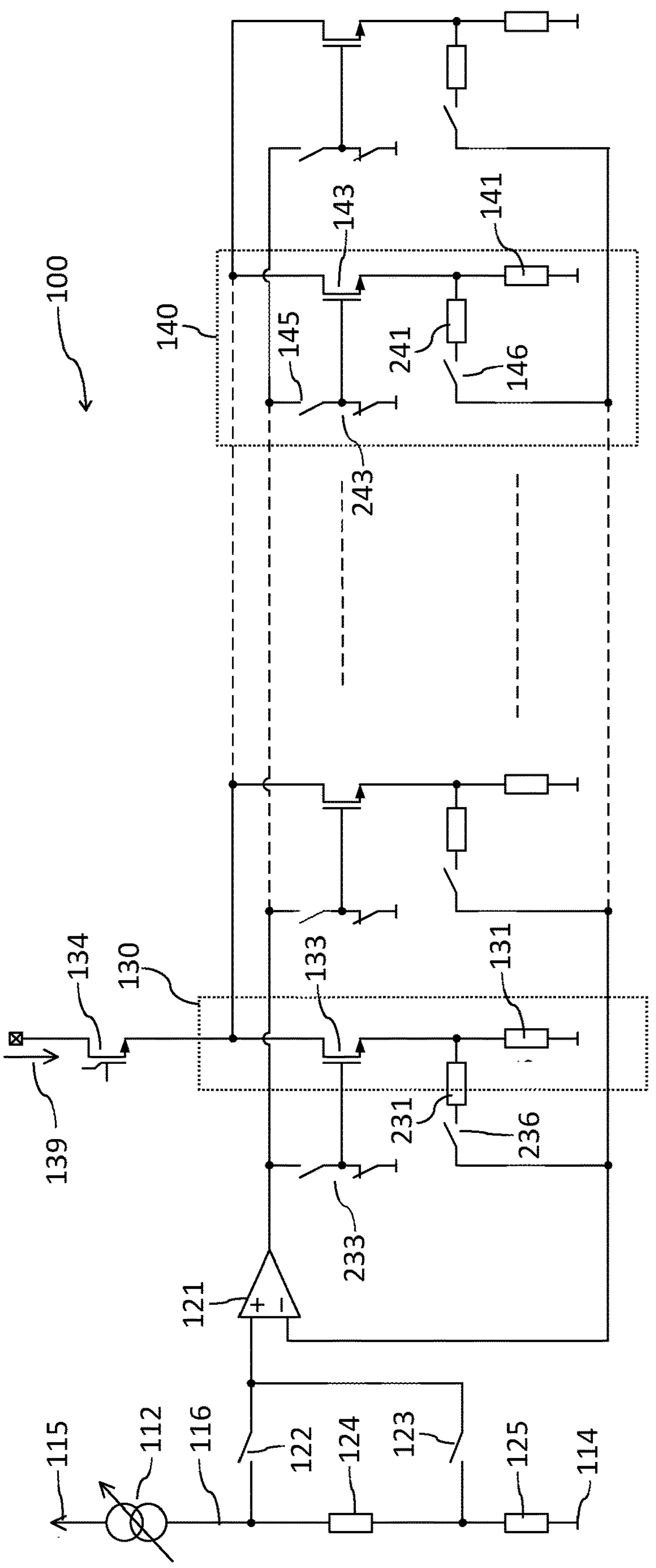

FIG. 2 shows a further example of a driver circuit 100. The driver circuit 100 comprises feedback resistors 231, 241 on the feedback paths to the second input of the differential amplifier 121. The feedback resistor 231, 241 of a branch 130, 140 may have a resistance value which is equal to or proportional to the resistance value of the resistor element 131, 141 of the same branch 130, 140. The feedback resistors 231, 241 may be designed such that the ratio of the resistance between the feedback resistor 231 and the resistive element 131 (used for the main branch 130) is equal to the ratio of the feedback resistor 241 and the resistive element 141 (used for an auxiliary branch). By making use of feedback resistors 231, 241, the performance of the driver circuit 100 may be increased. The feedback resistors 231, 241 may be implemented as the on-resistance of the feedback switches 236, 146 on the different feedback paths.

The switches 233, 243, 236, which are shown in FIG. 2 may be used to activate or deactivate the individual branches 130, 140.

Hence, a driver circuit 100 is described, which may be implemented as a programmable current source. The driver circuit 110 comprises a first block 110 with a linear DAC 111 (Digital-To-Analog-Converter). Furthermore, the driver circuit 110 comprises a second block 120 which comprises an exponential gain stage. The gain stage 120 is configured to amplify the intermediate current 116 which is generated by the DAC 111. It should be noted that alternatively, the DAC 111 may be exponential and the gain stage within the second block 120 may be linear.

The gain stage 120 comprises a feedback loop which regulates the driver current 139 through the output branch 130, 140 to match and/or to be proportional to the input current through the input branch. The gain of the gain stage 120 may be programmed by setting the ratio between the matching current elements of the input branch and the output branch. By doing this, the required headroom voltage (i.e., the voltage drop across the current sink) is substantially constant over the entire programmable current range. The headroom voltage typically only depends on the input current which is set by the DAC 111 and the input current stays within limited bounds over the entire range of the output current 139.

By changing the configuration of the input branch of the gain stage 120 the output current 139 increases accordingly, thereby increasing the required headroom voltage on the output side.

In order to increase the gain 320 in an exponential manner, the gain 320 of a setting n+1 needs to be higher by a certain factor than in setting n. The factor may vary between different subranges 308. For the mapping of the input code to the output current, it may be beneficial if the gain factor between different settings or subranges 308 is constant. By way of example, a periodically repeating gain factor (e.g., the gain factors of every second subrange 308 are identical) may be used.

There are different options to implement the unit elements of the current source. E.g. resistors, transistors in resistive operation, transistors in current source operation. The implementation shown here uses resistors where the voltage across them is regulated by a feedback loop.

The linearity (DNL) of the overall programmable gain stage (notably current source) may be degraded by the non-ideal nature of the feedback amplifier 121, the transistors 133, 143 and/or the resistive elements 131, 141. As illustrated in FIG. 2, feedback resistors 231, 241 may be used within the feedback lines. In particular, the feedback lines from the intersection point of the current defining resistor 131, 141 and the terminal of the transistor 233, 243 may exhibit a certain resistance. By doing this, the driving transistors 133. 143 may be allowed to have a relatively large mismatch.

The resistance in the feedback path of each current sink branch 130, 140 may be designed to scale with the drive strength of that branch 130, 140. In other words, the ratio between the feedback-path-resistors 231, 241 may match the ratio of the branch drive strengths ratios. Even if the feedback-path-resistances 231, 241 do not match well, the mismatch error of the transistors 133, 143 may be suppressed significantly. This can be shown mathematically (because the absolute mismatch error of the transistors 133, 143 is multiplied by the relative mismatch error between the feedback-path-resistances 231, 241). By doing this, the overall area of the driver circuit 100 can be reduced and the elements defining the feedback-path-resistance 231, 241 do not need to be placed inside the matching array of transistors 133, 143 or resistors 131, 141.

For ranges of the currents sink where the gain setting is constant, the exponential current may be interpolated by the linear DAC 111 only.

Hence, a combination of a linear DAC 111 and an exponential programmable gain stage 120 is described. The gain of the gain stage 120 may be programmable via the output driver strength for a constant headroom voltage and/or via the input impedance with varying headroom requirements (e.g., relatively high headroom voltage for relatively high output currents 139).

A weighted averaging may be provided for the different feedback lines of the programmable gain stage branches 130, 140, thereby relaxing the matching requirements (with regards to the sizes) of the different transistors 133, 143 in the gain stage 120.

The gain stage scaling may be exponential, such that when changing from one subrange 308 to the next subrange 308, the gain value 320 increases by a certain factor, wherein the factor may be different for different transitions between adjacent subranges 308.

The driver circuit 100 may exhibit the following features,

- a relatively high accuracy (e.g., 1% accurate);
- a relatively low headroom voltage (e.g., 100 mV voltage drop across the current sink);
- a relatively wide dynamic range (e.g., a factor of 1000);
- an exponential transfer function (e.g., $I_{out}=I_{in}(1.003)^{code}$ wherein code is the value of the brightness code 301;
- a relatively high resolution (e.g., min current step=$I_{max}$ $10^{-6}$);
- a relatively high linearity (e.g., DNL=0.5LSB);
- a relatively high voltage tolerance (e.g., up to 30V voltage drop across the current sink); and/or
- a full linear/continuous time operation (i.e., no PWM of current sink).

Figure 4:
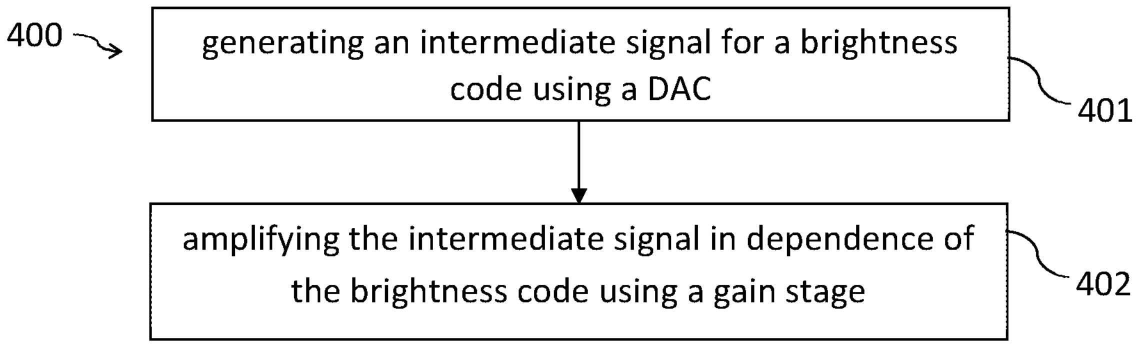
FIG. 4 shows a flow chart of an example method for generating the driver signal for driving a light emitting unit.

FIG. 4 shows a flow chart of an example method 400 for providing a driver current 139 for operating a light emitting unit at a brightness level corresponding to a value of a brightness code 301. The method 400 comprises generating 401 an intermediate signal 116 in dependence of the value of the brightness code 301 using a (linear) digital-to-analog converter, DAC, stage 110. Furthermore, the method 400 comprises amplifying 402 the intermediate signal 116 in dependence of the value of the brightness code 301, using a (exponential) gain stage 120, to provide the driver current 139.

Hence, a driver circuit 100 for providing a driver current 139 for operating a light emitting unit (which may comprise one or more LEDs) at a brightness level corresponding to a value of a brightness code 301 is described. The driver circuit 100 may be configured to approximate a target relationship 309, in particular an exponential relationship, between the value range of the brightness code 301 (which may e.g., be limited to integer numbers) and the value range of the driver current 139. The target relationship 309 may be dependent on or may be defined by the light emitting unit. In particular, the target relationship 309 may indicate (for each possible value from the value range of the brightness code) which level of the driver current 139 is required to cause the light emitting unit to emit light at a brightness level which corresponds to the respective value of the brightness code. 301

The driver circuit 100 comprises a digital-to-analog converter, DAC, stage 110 which is configured to generate an intermediate signal 116 (notably an intermediate current) in dependence of the value of the brightness code 301. The control unit 150 of the driver circuit 100 may be configured to determine a digital input value 310 for the input to the DAC 111 of the DAC stage 110 based on the value of the brightness code 301. The DAC 111 may convert the digital input value 310 into the intermediate signal 116 (e.g., using a controlled current source 112).

Furthermore, the driver circuit 100 comprises a gain stage 120 which is configured to amplify the intermediate signal 116 in dependence of the value of the brightness code 301 to provide the driver current 139. The control unit 150 may be configured to set the gain value 320 of the gain stage 120 based on the value of the brightness code 301.

Hence, a driver circuit 100 is described which combines the use of a gain stage 120 (for providing a relatively coarse exponential amplification) and a DAC stage 110 (for providing a relatively precise interpolation between the gain values 320 of the gain stage 120). By combining these two stages 110, 120, a (exponential) target relationship 309 can be approximated in an efficient and precise manner.

As indicated above, the DAC stage 110 may comprise a current source 112 which is controlled by the output of the DAC 111, to provide the intermediate signal 116 in dependence of the digital input value 310 to the DAC 111. The digital input value 310 to the DAC 111 may be determined in dependence of the value of the brightness code 301 (e.g., using a pre-determined mapping table 319). As a result of this, interpolation between the relatively coarse gain values 320 of the gain stage 120 may be achieved in an efficient and precise manner.

The gain stage 120 may comprise a differential amplifier 121 (e.g., an operational amplifier), and the intermediate signal 116 may be coupled to a first input of the differential amplifier 121. The first input of the differential amplifier 121 may be coupled to the reference potential 114 via one or more (input) resistors 124, 125.

The gain stage 120 may comprise a main gain branch 130 comprising a main transistor 133 which is controlled by the output of the differential amplifier 121 and a main resistive element 131 which is arranged between a first port of the main transistor 133 and the reference potential 114. The driver current 139 may be provided at the second port of the main transistor 133.

Furthermore, the gain stage 120 may comprise a set of auxiliary gain branches 140 (e.g., N auxiliary gain branches 140, with N equal to 2 or more, or 5 or more, or 10 or more). By way of example, N may lie between 2 and 20. Each auxiliary gain branch 140 may comprise an auxiliary transistor 143 which is controlled by the output of the differential amplifier 121 and an auxiliary resistive element 141 which is arranged between the first port of the auxiliary transistor 141 and the reference potential 114. The N different auxiliary gain branches 140 may be used to set different gain values 320 of the gain stage 120.

The gain stage 120 may comprise a set of switches 145, 146 configured to activate or to deactivate the corresponding set of auxiliary gain branches 140, respectively, to adjust the gain value 320 of the gain stage 120. By activating an auxiliary gain stage 140, the auxiliary resistive element 141 may be arranged in parallel to the main resistive element 131, thereby increasing the gain value 320 of the gain stage 120. By activating different combinations of zero, one or more auxiliary gain stages 140, different gain values 320 may be provided. By selecting the resistance values of the resistive elements 131, 141, a set 329 of exponentially increasing gain values 320 may be provided.

The main gain branch 130 may comprise a feedback path from the first port of the main transistor 131 to the second input of the differential amplifier 121. Furthermore, each auxiliary gain branch 140 from the set of auxiliary gain branches 140 may comprise a feedback path from the first port of the respective auxiliary transistor 141 to the second input of the differential amplifier 121 (if the respective auxiliary gain branch 140 is activated).

The driver circuit 100 may be configured to provide a weighted average of the signal on the feedback path of the main gain branch 130 and of the signals on the feedback paths of the one or more activated auxiliary gain branches 140 to the second input of the differential amplifier 121. The weights for the different feedback paths may depend on the resistance values of the resistive elements 131, 141 of the different gain branches 130, 140.

In particular, the main gain branch 130 may comprise a main feedback resistor 231 on the feedback path. Furthermore, each auxiliary gain branch 140 from the set of auxiliary gain branches 140 may comprise an auxiliary feedback resistor 241 on the feedback path. The feedback resistors 231, 241 on the different feedback paths may be implemented as the on-resistance of the respective feedback switches 236, 146 on the different feedback paths. The resistance value of the main resistive element 131 may be equal to the resistance value of the main feedback resistor 231. Alternatively, or in addition, for each auxiliary gain branch 140, the resistance value of the auxiliary resistive element 141 may be equal to the resistance value of the auxiliary feedback resistor 241.

In particular, the ratio of the resistance value of the main resistive element 131 to the resistance value of the main feedback resistor 231 may be (substantially) equal to the ratio of the resistance value of the auxiliary resistive element 141 to the resistance value of the auxiliary feedback resistor 241. In particular, the ratios may deviate from one another by 10% or less. This may be the case for some or for all of the auxiliary gain branches 140.

By providing weights on the different feedback paths, the precision of the driver circuit 100 may be increased and/or the requirements with regards to the sizing of the different transistors 133, 143 may be relaxed.

Hence, the gain stage 120 may be configured to take on a set of different configurations (e.g., N different configurations) for providing a corresponding set 329 of different gain values 320. The set 329 of different gain values 320 may be associated with a corresponding set of different subranges 308 of the value range of the brightness code 301. In particular, the value range of the brightness code 301 may be subdivided into a sequence of (N) subranges 308. The gain stage 120 may be configured to provide a (notably exactly one) gain value 320 for each subrange 308. The gain values 320 from the set 329 of different gain values 320 may increase exponentially for succeeding subranges 308 from the set of subranges 308 (thereby providing a coarse approximation of the target relationship 309).

The control unit 150 may be configured to identify the subrange 308 from the set of different subranges 308 that the value of the brightness code 301 lies in. The gain stage 120 may then be operated in the particular configuration for providing the gain value 320 that the identified subrange 308 is associated with. For this purpose, one or more auxiliary gain branches 140 may be activated.

The control unit 150 may be configured to determine the digital input value 310 for the value of the brightness code 301 using a (pre-determined) mapping table 319, wherein the mapping table 319 may indicate for each value from the value range of the brightness code 301 a corresponding digital input value 310.

The mapping table 319 may comprise a set of sub-tables for the corresponding set of subranges 308 of the value range of the brightness code 301. The sub-table for a given subrange 308 may be designed such that the sequence of digital input values 310 which is indicated by the sub-table for the corresponding sequence of values of the brightness code 301 from the given subrange 308 approximates the target relationship 309 between the brightness code 301 and the driver current 139 within the given subrange 308 (after the different digital input values 310 have been amplified using the gain value 320 for the given subrange 308). The same may apply for all subranges 308, thereby providing an efficient and precise approximation of the target relationship 309.

The mapping table may be implemented as a static look-up table or as a look-up algorithm, depending on the desired trade-off of area versus time.

The control unit 150 may be configured to identify the subrange 308 from the set of different subranges 308 that the value of the brightness code 301 lies in. Furthermore, the control unit 150 may be configured to determine the digital input value 310 for the value of the brightness code 301 from the sub-table that the identified subrange 308 corresponds to. As a result of this, the intermediate signal 116 may be generated in a precise manner.

It should be noted that the description and drawings merely illustrate the principles of the proposed methods and systems. Those skilled in the art will be able to implement various arrangements that, although not explicitly described or shown herein, embody the principles of the invention and are included within its spirit and scope. Furthermore, all examples and embodiment outlined in the present document are principally intended expressly to be only for explanatory purposes to help the reader in understanding the principles of the proposed methods and systems. Furthermore, all statements herein providing principles, aspects, and embodiments of the invention, as well as specific examples thereof, are intended to encompass equivalents thereof.

The invention claimed is:

1. A driver circuit for providing a driver current for operating a light emitting unit at a brightness level corresponding to a value of a brightness code; wherein the driver circuit comprises:

a digital-to-analog converter (DAC) stage configured to generate an intermediate signal in dependence of the value of the brightness code, wherein a level of the intermediate signal depends on a digital input value being inputted to the DAC stage, wherein the DAC stage is configured to convert the digital input value into an analog value representing a current using a linear mapping between the digital input value and the level of the intermediate level; and a gain stage configured to amplify the intermediate signal in dependence of the value of the brightness code to provide the driver current for approximation of a target relationship between the brightness code and the driver current.

2. The driver circuit of claim 1, wherein the driver circuit comprises a control unit configured to:

determine the digital input value to a DAC of the DAC stage based on the value of the brightness code; and set a gain value of the gain stage based on the value of the brightness code.

3. The driver circuit of claim 2, wherein:

the gain stage is configured to take on a set of different configurations for providing a corresponding set of different gain values;

the set of different gain values is associated with a corresponding set of different subranges of a value range of the brightness code; and the control unit is configured to:

identify the subrange from the set of different subranges that the value of the brightness code lies in; and operate the gain stage in the configuration for providing the gain value that the identified subrange is associated with.

4. The driver circuit of claim 3, wherein the gain values from the set of different gain values increase exponentially for succeeding subranges from the set of subranges.

5. The driver circuit of claim 3, wherein:

the control unit is configured to determine the digital input value for the value of the brightness code using a mapping table; and the mapping table indicates for each value from a value range of the brightness code a corresponding digital input value.

6. The driver circuit of claim 5, wherein:

the mapping table comprises a set of sub-tables for a corresponding set of subranges of the value range of the brightness code; and the control unit is configured to:

identify the subrange from the set of different subranges that the value of the brightness code lies in; and determine the digital input value for the value of the brightness code from the sub-table that the identified subrange corresponds to.

7. The driver circuit of claim 6, wherein the sub-table for a given subrange is designed such that a sequence of digital input values which are indicated by the sub-table for a corresponding sequence of values of the brightness code from the given subrange, and which are amplified using the gain value for the given subrange approximate a target relationship between the brightness code and the driver current within the given subrange.

8. The driver circuit of claim 1, wherein the driver circuit is configured to approximate the target relationship between the brightness code and the driver current, and wherein the target relationship indicates relationship between a value range of the brightness code and a value range of the driver current.

9. The driver circuit of claim 1, wherein:

the DAC stage comprises a current source which is controlled by an output of a DAC, to provide the intermediate signal in dependence of a digital input value to the DAC; and the digital input value to the DAC depends on the value of the brightness code.

10. The driver circuit of claim 1, wherein:

the gain stage comprises a differential amplifier;

the intermediate signal is coupled to a first input of the differential amplifier;

the gain stage comprises a main gain branch comprising a main transistor which is controlled by an output of the differential amplifier and a main resistive element which is arranged between a first port of the main transistor and a reference potential;

the driver current is provided at a second port of the main transistor;

the gain stage comprises a set of auxiliary gain branches;

each auxiliary gain branch comprises an auxiliary transistor which is controlled by the output of the differential amplifier and an auxiliary resistive element which is arranged between a first port of the auxiliary transistor and the reference potential; and the gain stage comprises a set of switches configured to activate or to deactivate the corresponding set of auxiliary gain branches, respectively, to adjust the gain value of the gain stage.

11. The driver circuit of claim 10, wherein:

the main gain branch comprises a feedback path from the first port of the main transistor to a second input of the differential amplifier; and each auxiliary gain branch from the set of auxiliary gain branches comprises a feedback path from the first port of the respective auxiliary transistor to the second input of the differential amplifier, if the respective auxiliary gain branch is activated.

12. The driver circuit of claim 11, wherein:

the driver circuit is configured to provide a weighted average of a signal on the feedback path of the main gain branch and of signals on the feedback paths of the one or more activated auxiliary gain branches to the second input of the differential amplifier; and weights for different feedback paths depend on resistance values of the resistive elements of the different gain branches.

13. The driver circuit of claim 11, wherein:

the main gain branch comprises a main feedback resistor on the feedback path; and each auxiliary gain branch from the set of auxiliary gain branches comprises an auxiliary feedback resistor on the feedback path.

14. The driver circuit of claim 13, wherein, for each auxiliary gain branch, a ratio of a resistance value of the main resistive element to a resistance value of the main feedback resistor is equal to a ratio of a resistance value of the auxiliary resistive element to a resistance value of the auxiliary feedback resistor.

15. A method for providing a driver current for operating a light emitting unit at a brightness level corresponding to a value of a brightness code; wherein the method comprises:

generating an intermediate signal in dependence of the value of the brightness code using a digital-to-analog converter (DAC) stage, wherein a level of the intermediate signal depends on a digital input value being inputted to the DAC stage, wherein the DAC stage is configured to convert the digital input value into an analog value representing a current using a linear mapping between the digital input value and the level of the intermediate level; and amplifying the intermediate signal in dependence of the value of the brightness code, using a gain stage, to provide the driver current for approximation of a target relationship between the brightness code and the driver current.

* * * * *